United States Patent
Koehn

[11] Patent Number: 6,092,905
[45] Date of Patent: Jul. 25, 2000

[54] ILLUMINATED BEVERAGE CONTAINER HOLDER

[76] Inventor: Christopher D. Koehn, 4110 Laguna Cir., Missouri City, Tex. 77459

[21] Appl. No.: 09/311,416

[22] Filed: May 13, 1999

[51] Int. Cl.⁷ .................................................. F21V 33/00
[52] U.S. Cl. ............................................ 362/101; 365/154
[58] Field of Search ................................... 362/101, 154, 362/880

[56] References Cited

U.S. PATENT DOCUMENTS

| | | | |
|---|---|---|---|
| 4,886,183 | 12/1989 | Fleming | 362/101 X |
| 5,119,279 | 6/1992 | Makowsky | 362/101 |
| 5,211,699 | 5/1993 | Tipton | 362/101 |

*Primary Examiner*—Stephen Husar

[57] ABSTRACT

A illuminated beverage container holder for illuminating the area around the beverage container held therein so that a user may easily locate the beverage container in low light conditions. The illuminated beverage container holder includes a base with a perimeter side wall upwardly extending therearound to define a receptacle designed for receiving therein a beverage container. The perimeter side wall has an outwardly radiating annular lip around a top edge of the perimeter s.

7 Claims, 2 Drawing Sheets

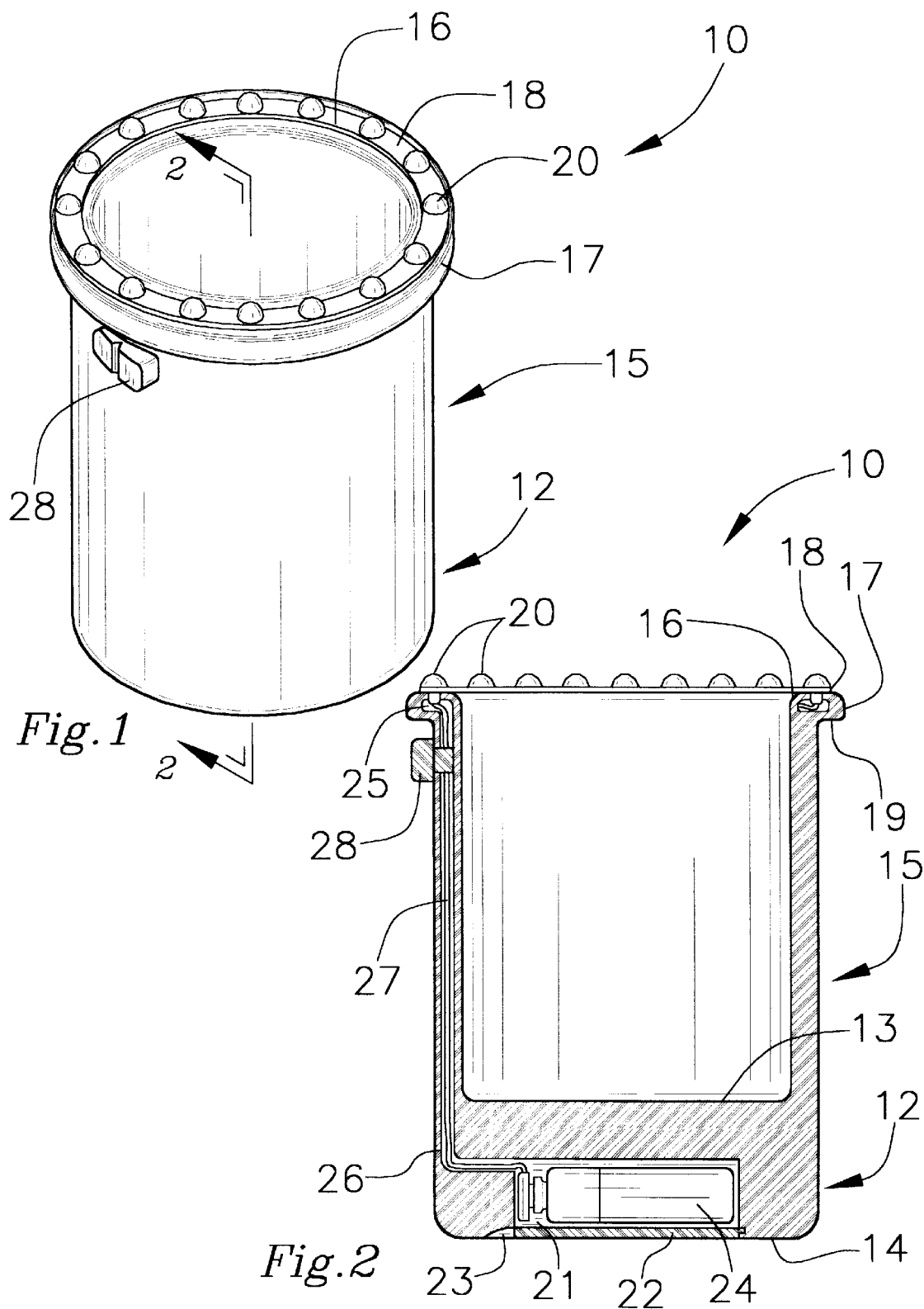

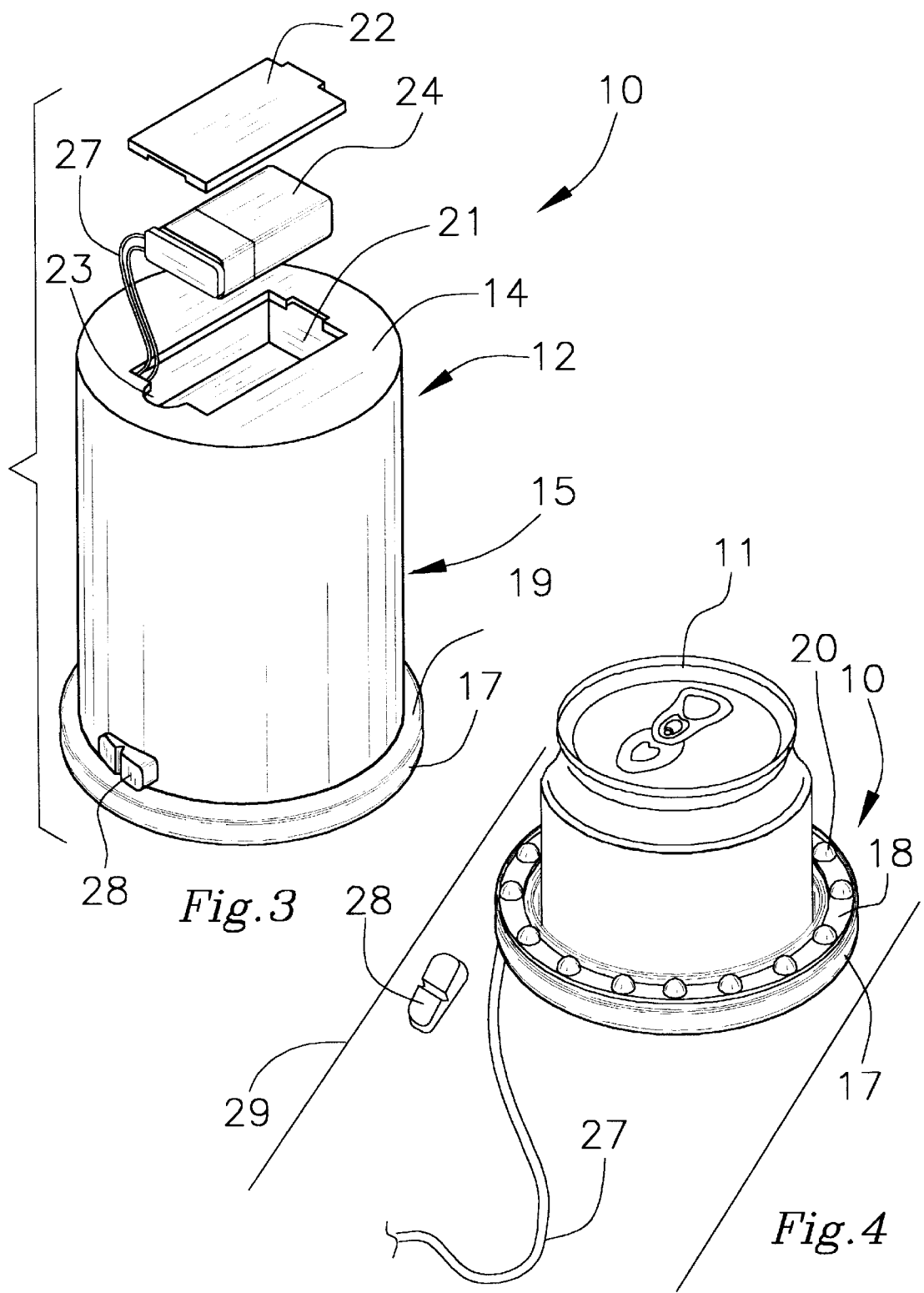

ILLUMINATED BEVERAGE CONTAINER HOLDER

BACKGROUND OF THE INVENTION

1. Field of the Invention

The present invention relates to illuminated beverage container holders and more particularly pertains to a new illuminated beverage container holder for illuminating the area around the beverage container held therein so that a user may easily locate the beverage container in low light conditions.

2. Description of the Prior Art

The use of illuminated beverage container holders is known in the prior art. More specifically, illuminated beverage container holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,745,947; U.S. Pat. No. 4,858,084; U.S. Pat. No. 4,254,452; U.S. Pat. No. 4,336,574; U.S. Pat. No. 5,375,805; and U.S. Pat. No. Des. 366 813.

While these devices fulfill their respective, particular objectives and requirements, the aforementioned patents do not disclose a new illuminated beverage container holder. The inventive device includes a base with a perimeter side wall upwardly extending therearound to define a receptacle designed for receiving therein a beverage container. The perimeter side wall has an outwardly radiating annular lip around a top edge of the perimeter s.

In these respects, the illuminated beverage container holder according to the present invention substantially departs from the conventional concepts and designs of the prior art, and in so doing provides an apparatus primarily developed for the purpose of illuminating the area around the beverage container held therein so that a user may easily locate the beverage container in low light conditions.

SUMMARY OF THE INVENTION

In view of the foregoing disadvantages inherent in the known types of illuminated beverage container holders now present in the prior art, the present invention provides a new illuminated beverage container holder construction wherein the same can be utilized for illuminating the area around the beverage container held therein so that a user may easily locate the beverage container in low light conditions.

The general purpose of the present invention, which will be described subsequently in greater detail, is to provide a new illuminated beverage container holder apparatus and method which has many of the advantages of the illuminated beverage container holders mentioned heretofore and many novel features that result in a new illuminated beverage container holder which is not anticipated, rendered obvious, suggested, or even implied by any of the prior art illuminated beverage container holders, either alone or in any combination thereof.

To attain this, the present invention generally comprises a base with a perimeter side wall upwardly extending therearound to define a receptacle designed for receiving therein a beverage container. The perimeter side wall has an outwardly radiating annular lip around a top edge of the perimeter s.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated beverage container holder apparatus and method which has many of the advantages of the illuminated beverage container holders mentioned heretofore and many novel features that result in a new illuminated beverage container holder which is not anticipated, rendered obvious, suggested, or even implied by any of the prior art illuminated beverage container holders, either alone or in any combination thereof.

It is another object of the present invention to provide a new illuminated beverage container holder which may be easily and efficiently manufactured and marketed.

It is a further object of the present invention to provide a new illuminated beverage container holder which is of a durable and reliable construction.

An even further object of the present invention is to provide a new illuminated beverage container holder which is susceptible of a low cost of manufacture with regard to both materials and labor, and which accordingly is then susceptible of low prices of sale to the consuming public, thereby making such illuminated beverage container holder economically available to the buying public.

Still yet another object of the present invention is to provide a new illuminated beverage container holder which provides in the apparatuses and methods of the prior art some of the advantages thereof, while simultaneously overcoming some of the disadvantages normally associated therewith.

Still another object of the present invention is to provide a new illuminated beverage container holder for illuminating the area around the beverage container held therein so that a user may easily locate the beverage container in low light conditions.

Yet another object of the present invention is to provide a new illuminated beverage container holder which includes a base with a perimeter side wall upwardly extending therearound to define a receptacle designed for receiving therein a beverage container. The perimeter side wall has an outwardly radiating annular lip around a top edge of the perimeter s.

Still yet another object of the present invention is to provide a new illuminated beverage container holder that is easy to see at night.

Even still another object of the present invention is to provide a new illuminated beverage container holder that is ideal for use in a vehicle either as an after-market item which is inserted into a pre-existing cup holder of the vehicle or constructed integrally into the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic top perspective view of a new illuminated beverage container holder according to the present invention.

FIG. 2 is a schematic cross sectional view of the present invention taken from line 2—2 of FIG. 1.

FIG. 3 is a schematic exploded bottom perspective view of the present invention.

FIG. 4 is a schematic perspective view of the console embodiment of the present invention with a beverage container therein.

DESCRIPTION OF THE PREFERRED EMBODIMENT

With reference now to the drawings, and in particular to FIGS. 1 through 4 thereof, a new illuminated beverage container holder embodying the principles and concepts of the present invention and generally designated by the reference numeral 10 will be described.

As best illustrated in FIGS. 1 through 4, the illuminated beverage container holder 10 generally comprises a base with a perimeter side wall upwardly extending therearound to define a receptacle designed for receiving therein a beverage container. The perimeter side wall has an outwardly radiating annular lip around a top edge of the perimeter side wall with a plurality of light sources provided on the annular lip.

In use, the an illuminated beverage container holder 10 is designed for holding therein a generally cylindrical beverage container 11 such as a soft drink can. In closer detail, the illuminated beverage container holder comprises a generally disk-shaped base 12 having generally circular upper and lower faces 13,14, and a generally circular outer perimeter. A generally cylindrical perimeter side wall 15 upwardly extends from the upper face of the base along the outer perimeter of the base. The perimeter side wall has a generally circular top edge 16. In an ideal embodiment, the top edge has an inner diameter of about 3 inches.

The perimeter side wall defining a generally cylindrical receptacle designed for receiving therein a generally cylindrical beverage container with the top edge of the perimeter side wall defining a generally circular opening into the receptacle. Preferably, the perimeter side wall has an outwardly radiating annular lip 17 around the top edge of the perimeter side wall. The annular lip of the perimeter side wall has a generally rectangular transverse cross section defining substantially planar top and bottom faces 18,19 of the annular lip.

A plurality of light sources 20 are provided on the top face of the annular lip. Preferably, the light sources is spaced apart at generally equal intervals around the annular lip. Ideally, the light sources each comprise a light emitting diode and with each light source having a generally hemispherical dome shaped upper surface upwardly extending from the top face of the annular lip.

In one preferred embodiment, the base has a generally rectangular cavity 21 in lower face of the base. The base has a removable access panel 22 covering the cavity of the base which lies in a common plane with the lower face of the base when the access panel covers the cavity of the base. Preferably, the lower face of the base also has a finger depression 23 adjacent the cavity of the base to aid removal of the access panel from the base.

A generally rectangular battery 24 is disposed in the cavity of the base. The battery is electrically connected to the light sources for providing energy for illuminating the light sources. Preferably, as best illustrated in FIG. 2, the annular lip has an annular passage 25 therein. The perimeter side wall has an elongate passage 26 extending between the annular passage of the annular flange and the cavity of the base such that the cavity of the base is in communication with the annular passage. An elongate electrical conduit 27 is extended from the cavity through the elongate passage of the perimeter side wall and into the annular passage of the annular lip. The electrical conduit is electrically connected to each of the light sources and also detachably attached and electrically connected to the battery to electrically connect the battery to the light sources such that the battery provides energy to illuminate the light sources.

Preferably, a switch 28 is mounted on the perimeter side wall and is electrically connected to the electrical conduit between the battery and the light sources to perimeter selective activation of the light sources.

With reference to FIG. 4, in another preferred embodiment, the base and the perimeter side wall may be integrally formed in a console 29 of a vehicle. In such an embodiment, the electrical conduit is electrically connect to a power supply of the vehicle instead of to the battery and the switch is mounted to the console.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated holder for a beverage container, said illuminated holder comprising:

a base having upper and lower faces, and an outer perimeter;

a perimeter side wall upwardly extending from said upper face of said base along said outer perimeter of said base;

said perimeter side wall having a top edge;

said perimeter side wall defining a receptacle adapted for receiving therein a beverage container, said top edge of said perimeter side wall defining an opening into said receptacle;

said perimeter side wall having an outwardly radiating annular lip around said top edge of said perimeter side wall; and a plurality of light sources being provided on said annular lip.

2. The illuminated holder of claim 1, wherein said annular lip of said perimeter side wall has a generally rectangular transverse cross section defining substantially planar top and bottom faces of said annular lip, said light sources being located on said top face of said annular lip.

3. The illumined holder of claim 1, wherein said light sources are spaced apart at generally equal intervals around said annular lip.

4. The illuminated holder of claim 1, wherein said base has a cavity in lower face of said base, wherein a battery is disposed in said cavity of said base and electrically connected to said light sources.

5. The illuminated holder of claim 4, wherein said base has a removable access panel covering said cavity of said base.

6. The illuminated holder of claim 4, further comprising a switch mounted on said perimeter side wall and being electrically connected to said light sources to permit selective activation of said light sources.

7. An illuminated holder for a generally cylindrical beverage container, said illuminated holder comprising:

a generally disk-shaped base having generally circular upper and lower faces, and a generally circular outer perimeter;

a generally cylindrical perimeter side wall upwardly extending from said upper face of said base along said outer perimeter of said base;

said perimeter side wall having a generally circular top edge;

said perimeter side wall defining a generally cylindrical receptacle adapted for receiving therein a generally cylindrical beverage container, said top edge of said perimeter side wall defining a generally circular opening into said receptacle;

said perimeter side wall having an outwardly radiating annular lip around said top edge of said perimeter side wall;

said annular lip of said perimeter side wall having a generally rectangular transverse cross section defining substantially planar top and bottom faces of said annular lip;

a plurality of light sources being provided on said top face of said annular lip, said light sources being spaced apart at generally equal intervals around said annular lip;

said base having a generally rectangular cavity in lower face of said base, said base having a removable access panel covering said cavity of said base, said access panel lying in a common plane with said lower face of said base when said access panel covers said cavity of said base;

a generally rectangular battery being disposed in said cavity of said base;

said battery being electrically connected to said light sources for providing energy for illuminating said light sources;

wherein said annular lip having an annular passage therein;

said perimeter side wall having an elongate passage extending between said annular passage of said annular flange and said cavity of said base such that said cavity of said base is in communication with said annular passage;

an elongate electrical conduit being extended from said cavity through said elongate passage of said perimeter side wall and into said annular passage of said annular lip, said electrical conduit being electrically connected to each of said light sources, said electrical conduit being detachably attached and electrically connected to said battery to electrically connect said battery to said light sources such that said battery provides energy to illuminate said light sources; and a switch mounted on said perimeter side wall and being electrically connected to said electrical conduit between said battery and said light sources to perimeter selective activation of said light sources.

* * * * *